(12) United States Patent
Eitan et al.

(10) Patent No.: US 8,467,465 B2
(45) Date of Patent: Jun. 18, 2013

(54) CHANNEL ESTIMATION USING REPLICAS ZERO FORCING

(75) Inventors: Alecsander P. Eitan, Haifa (IL); Michael Leviant, Haifa (IL)

(73) Assignee: Qualcomm Incorporated, San Diego, CA (US)

( * ) Notice: Subject to any disclaimer, the term of this patent is extended or adjusted under 35 U.S.C. 154(b) by 294 days.

(21) Appl. No.: 12/849,663

(22) Filed: Aug. 3, 2010

(65) Prior Publication Data

US 2011/0206146 A1   Aug. 25, 2011

Related U.S. Application Data

(60) Provisional application No. 61/232,279, filed on Aug. 7, 2009.

(51) Int. Cl.
*H04K 1/10* (2006.01)

(52) U.S. Cl.
USPC .......................................... 375/260

(58) Field of Classification Search
USPC .......................................... 375/260
See application file for complete search history.

(56) References Cited

U.S. PATENT DOCUMENTS

| | | | |
|---|---|---|---|
| 6,654,429 B1 * | 11/2003 | Li | 375/316 |
| 6,763,074 B1 * | 7/2004 | Yang | 375/328 |
| 7,929,622 B2 * | 4/2011 | Cheng et al. | 375/260 |
| 7,929,645 B2 * | 4/2011 | Akella et al. | 375/340 |
| 2002/0065047 A1 | 5/2002 | Moose | |
| 2006/0133529 A1 * | 6/2006 | Lee et al. | 375/260 |
| 2008/0049598 A1 * | 2/2008 | Ma et al. | 370/208 |
| 2008/0144730 A1 * | 6/2008 | Akella et al. | 375/260 |
| 2008/0192843 A1 * | 8/2008 | Tenny et al. | 375/260 |
| 2009/0110044 A1 | 4/2009 | Wu et al. | |
| 2010/0008443 A1 * | 1/2010 | Casamajou | 375/267 |

FOREIGN PATENT DOCUMENTS

EP   1 903 728 A1   3/2008

OTHER PUBLICATIONS

Athaudage, "Low-complexity Channel Estimation for Wireless OFDM Systems", IEEE 2003.*
Morelli. "A Comparison of Pilot-Aided Channel Estimation Methods for OFDM Systems," IEEE 2001.*
International Search Repport and Written Opinion—PCT/US2010/044442—International Search Authority, European Patent Office, Jan. 25, 2011.
I-Tai Lu et al: "Channel estimation in a proposed IEEE802.11n OFDM MIMO WLAN Ssytem", Sarnoff Symposium, 2007 IEEE, IEEE, Piscataway, NJ, USA, Apr. 30, 2007, pp. 1-5, XP031287600, ISBN: 978-1-4244-2483-2.

* cited by examiner

*Primary Examiner* — Juan A Torres
(74) *Attorney, Agent, or Firm* — Fulbright & Jaworski L.L.P.

(57) ABSTRACT

Channel estimation for a wireless Orthogonal Frequency Division Multiplexed (OFDM) link having pilots on at least some carriers in at least some symbols may be implemented by performing first and second channel estimation processes. The first channel estimation process uses only frequency domain interpolation of the pilots to obtain a first candidate channel estimate for the OFDM link, and the second channel estimation process uses both time domain interpolation and frequency domain interpolation of the pilots to obtain a second candidate channel estimate for the OFDM link. One of the first and second candidate channel estimates is selected for processing a communication received via the OFDM link.

16 Claims, 4 Drawing Sheets

CHANNEL ESTIMATION USING REPLICAS ZERO FORCING

CLAIM OF PRIORITY UNDER 35 U.S.C. §119

The present application for patent claims priority to Provisional Application No. 61/232,279 entitled "Channel Estimation Using Replicas Zero Forcing", filed Aug. 7, 2009, and assigned to the assignee hereof and hereby expressly incorporated by reference herein.

BACKGROUND

1. Field

The present work relates generally to wireless communication and, more particularly, to channel estimation in Orthogonal Frequency Division Multiplexed (OFDM) communication.

2. Background

Conventional OFDM communication links that operate at high mobility (high Doppler spread) typically use scattered pilots. When the link is subject to high mobility and high delay spread the estimation of the channel transfer function at each OFDM symbol at each carrier is one of the main challenges. The scattered pilots in each symbol may be seen as frequency samples of the "true" FT (Fourier Transform) of the Channel Impulse Response (CIR). The prior art uses 2-D (time and frequency domains) interpolation techniques to interpolate the known scattered pilots. If, however, within a single OFDM symbol, the scattered pilots are evenly distributed but with a sampling rate that is too low, this causes ambiguity in the CIR reconstruction for high delay spread situations. More specifically, for cases of high Doppler and high delay spread, inaccuracy in time domain interpolation causes a problem with CIR estimation inaccuracy, referred to as aliasing. This aliasing phenomenon limits the performance of the existing solutions.

SUMMARY

Channel estimation for a wireless Orthogonal Frequency Division Multiplexed (OFDM) link having pilots on at least some carriers in at least some symbols may be implemented by performing first and second channel estimation processes. The first channel estimation process uses only frequency domain interpolation of the pilots to obtain a first candidate channel estimate for the OFDM link, and the second channel estimation process uses both time domain interpolation and frequency domain interpolation of the pilots to obtain a second candidate channel estimate for the OFDM link. One of the first and second candidate channel estimates is selected for processing a communication received via the OFDM link.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below is intended as a description of various embodiments of the present work and is not intended to represent the only embodiments in which the present work may be practiced. The detailed description includes specific details for the purpose of providing a thorough understanding of the present work. However, it will be apparent to those skilled in the art that the present work may be practiced without these specific details. In some instances, well known structures and components are shown in block diagram form in order to avoid obscuring the concepts of the present work.

The word "exemplary" is used herein to mean "serving as an example, instance, or illustration." Any embodiment described herein as "exemplary" is not necessarily to be construed as preferred or advantageous over other embodiments.

Exemplary embodiments of the present work use a technique referred to as Replicas Zero Forcing to achieve CIR (Channel Impulse Response) estimation. Also provided is a reliable method to evaluate the algorithm performance and bypass the algorithm when it may decrease performance. Replicas Zero Forcing supports channels for which estimation is beyond the capabilities of the prior art. Replicas Zero Forcing exploits the fact that in the typical CIR, the actual paths do not coincide with aliased replicas of any other paths. Replicas Zero Forcing is applicable to OFDM links where pilots are inserted in some of the carriers in some or all symbols.

Figure 4:
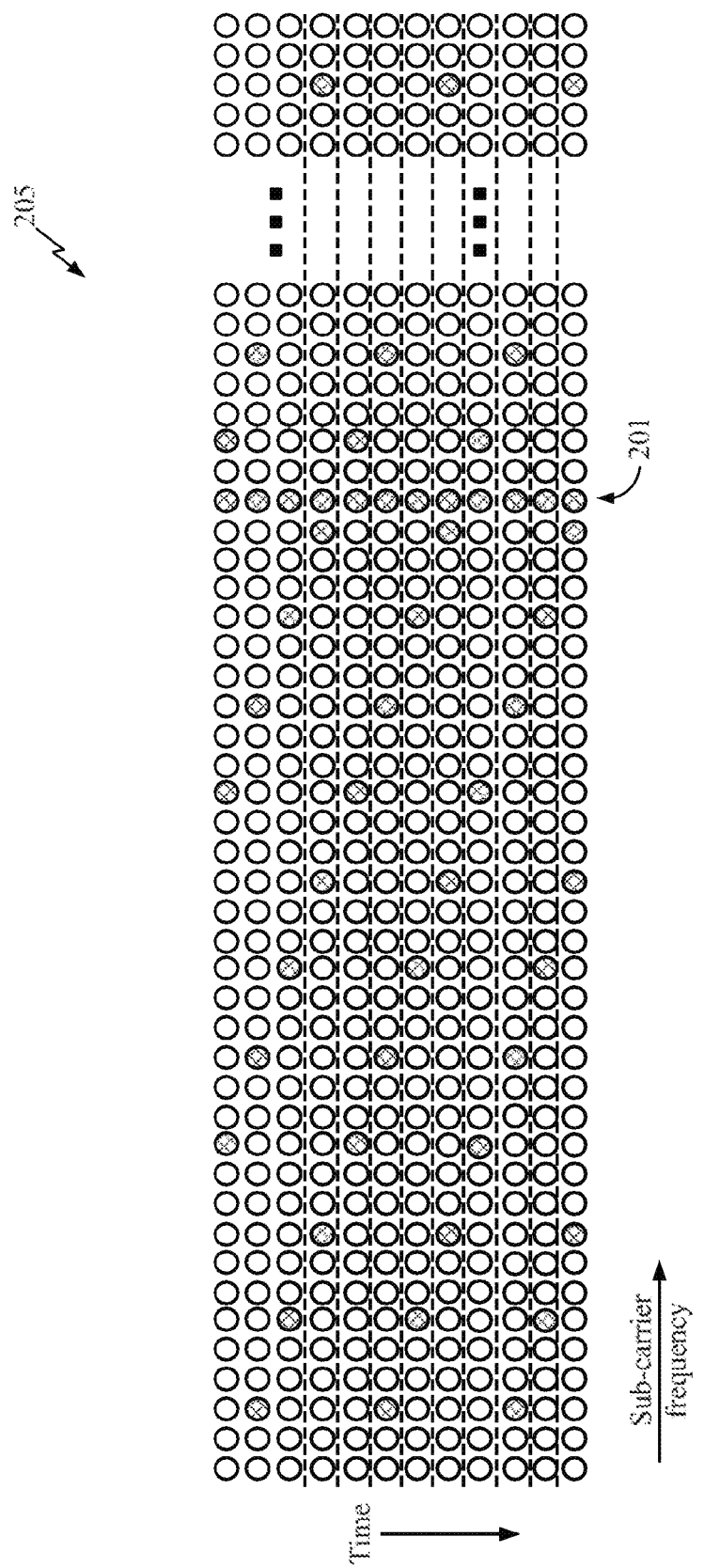
FIG. 4 shows a conventional OFDM frame.

Exemplary embodiments of the present work perform Channel Estimation (CE) as follows:

A 1-D (i.e., frequency domain interpolation only) CIR estimate is calculated based on the scattered pilots (e.g., 12 pilots) in one OFDM symbol. Consider the example of Scattered Pilots every 12 OFDM carriers. This is illustrated by the conventional OFDM frame 205 shown in FIG. 4. This frame 205 is described in detail in US Patent Publication No. 2008/0049598, which is incorporated herein by reference. Each left-to-right row in FIG. 4 represents an OFDM symbol, which is itself a set of multiple symbols (graphically represented as circles) respectively modulated by multiple distinct OFDM carriers (designated as sub-carrier frequencies in FIG. 4). Except for the column shown at 201, the darkened circles in FIG. 4 represent pilots. Accordingly, each OFDM symbol has a pilot on every $12^{th}$ OFDM carrier.

Taking as an example an OFDM symbol from FIG. 4, four path replicas will appear in the 1-D CIR, which causes ambiguity between the real path location and the locations of its replicas. There are 4 replicas since in the 2-D interpolation, after the time interpolation, there will be Pilots (actual or interpolated) every 3 OFDM carriers.

In order to solve this ambiguity, averaged absolute values of a time domain interpolation within a 2-D (time domain and frequency domain interpolations) CIR estimation process are used. The location of the real path in the 1-D CIR will be the same as the location of the maximum absolute value among all of the averaged time domain interpolation results in the 2-D process. The remaining paths (i.e., replica paths) are then eliminated (zeroed out) from the 1-D CIR estimate. This process is carried out for each possible path (and its replicas).

After the replicas zeroing, the 1-D CIR is used for 1-D Channel Estimation (CE). Interpolation for all data carriers is done. Error metrics for both the 2-D and 1-D channel estimates are calculated using known or reliably modulated (e.g., Binary Phase Shift Keying (BPSK) modulated in some embodiments) data carriers. Any available data carriers that have a signal that can be demodulated even with a low quality CE will suffice. The CE having the smaller error metric is chosen for use in signal demodulation. This is a switching function that switches between the 2-D CE and the 1-D CE.

The Replicas Zero Forcing technique is generally limited to cases where no real paths in the CIR coincide with replicas of other paths. However, this restriction is valid in most of practical channels. Moreover, the aforementioned error metrics and switching function provide the capability of backing off to the 2-D CE when this restriction is not valid. The technique is applicable to all OFDM links where pilots are inserted in some of the carriers in each or some symbols.

Figure 1:
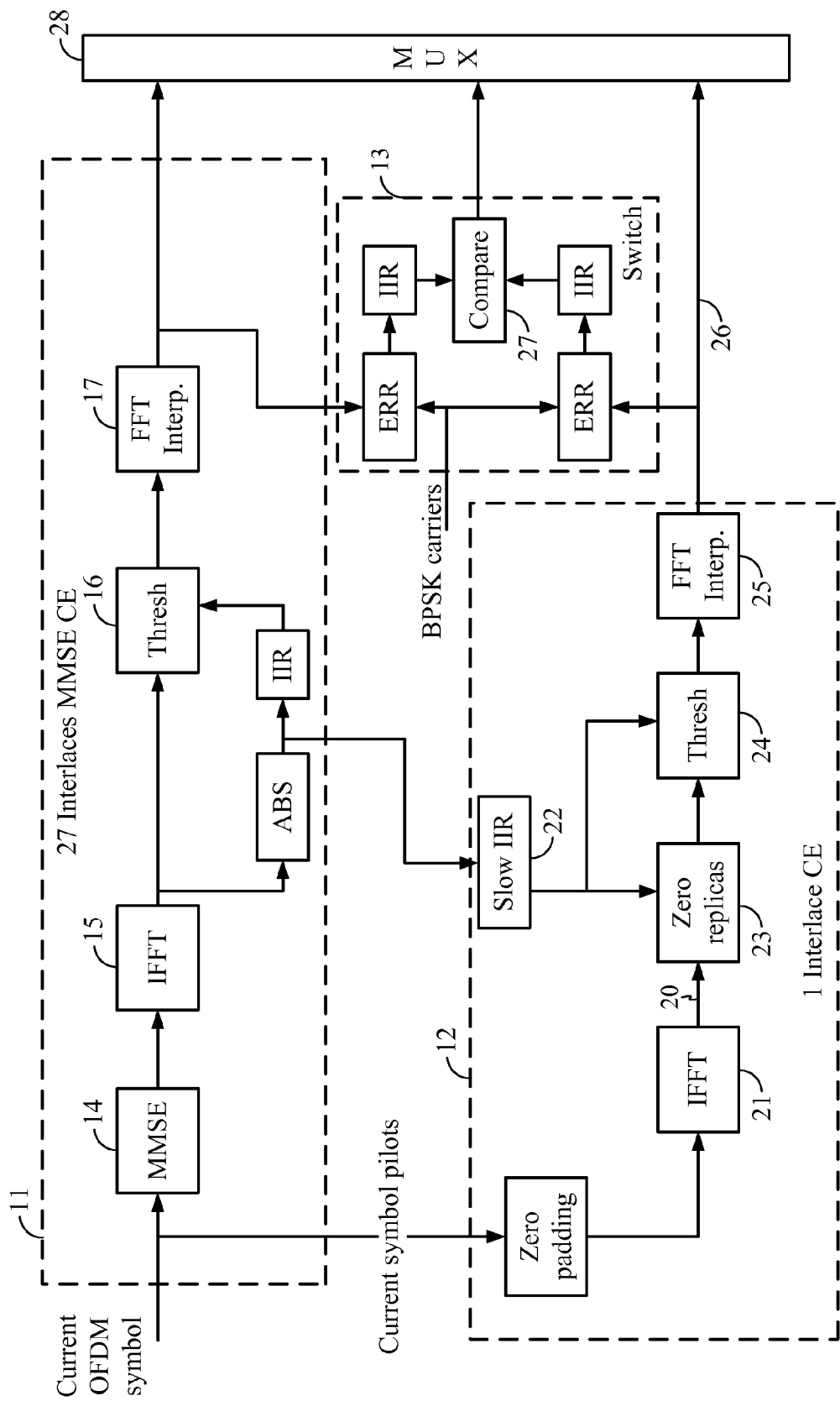
FIG. 1 diagrammatically illustrates a method and apparatus according to exemplary embodiments of the present work.

FIG. 1 diagrammatically illustrates a communication receiver according to the exemplary embodiments of the present work. The receiver of FIG. 1 includes a 27 interlaces Minimum Mean Square Error (MMSE) CE portion 11 (also referred to as the 2-D portion or the 2-D unit), a 1 interlace CE portion 12 (also referred to as the 1-D portion or 1-D unit), and a switching arrangement 13 (including a comparator 27). The embodiments of FIG. 1 are described herein with respect to an example OFDM link having scattered pilots, with a pilot on every 12th carrier of OFDM symbol. The current OFDM symbol (see, e.g., FIG. 4 and corresponding description) is received as input by the receiver.

The first phase of operation of the 2-D portion 11 is a MMSE estimation at 14 of three additional pilots for each transmitted pilot in the current OFDM symbol. In this example (see also FIG. 4), the scattered pilots in each timewise adjacent OFDM symbol are offset by 3 carriers from the previous symbol. For purposes of exposition, the estimation in this example is based on 26 neighbor OFDM symbols (hence the phrase, "27 interlaces MMSE CE"). Other examples use other quantities of neighbor symbols, generally N−1 neighbor symbols, such that the 27 interlaces MMSE CE process may be characterized more generally as an N interlaces MMSE CE process.

The second phase of operation of the 2-D portion is an IFFT at 15 that calculates the time domain channel response (including interpolation for all data carriers). The time domain channel response is cleared from noise using suitable thresholding at 16. The third phase of the 2-D portion is a frequency domain response calculation (FFT) including interpolation for all data carriers, shown at 17.

Figure 2:
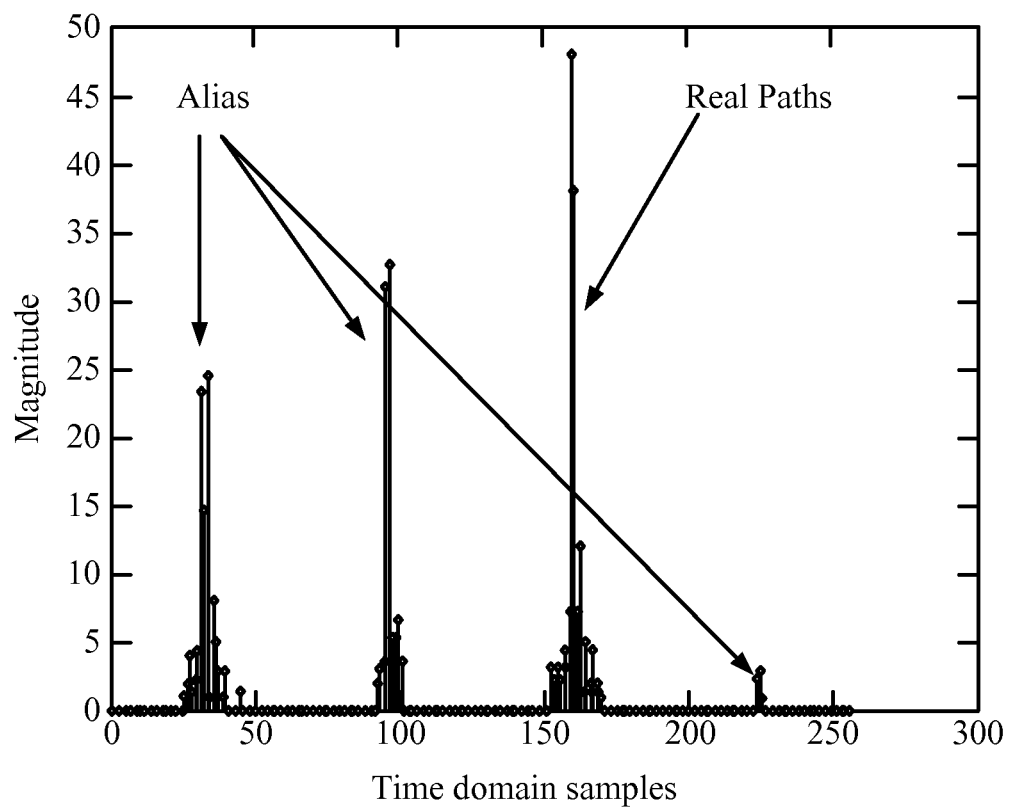
FIG. 2 graphically illustrates real and alias paths in an Inverse Fast Fourier Transform output in FIG. 1.

As mentioned above, in high Doppler conditions, due to inaccurate estimation in the first phase, alias paths appear in the output of the IFFT 15, as shown in FIG. 2.

In some embodiments, the processing enclosed by broken line in the 2-D portion 11 is conventional.

The following description of the 1-D portion 12 continues with the example of a scattered pilot every 12$^{th}$ carrier in an OFDM symbol. If the condition obtains that the delay between any two paths is not equal to T/12, 2*T/12 or 3*T/12 (where T is symbol duration without guard), then under that condition, the real path shown in FIG. 2 does not coincide with an alias. Therefore, for each four path locations separated by T/12 (see also FIG. 2) in the IFFT output 20, only one is the real path and three are aliases.

The time domain response produced by the 2-D portion 11 (averaged by slow IIR filtering as shown at 22 in FIG. 1), is used as mentioned above to discriminate between each the "real path" and its aliases. That is, the path replica with the largest averaged absolute value, as output by the slow IIR (Infinite Impulse Response) filter 22, is chosen as the real path. The aliases are identified and removed by a Zero Replicas portion 23 within the 1-D portion 12 of FIG. 1. After removal of the aliases, thresholding 24 and frequency domain response calculation (including interpolation for all data carriers) occurs at 25 generally the same manner as in the above-described operation of the 2-D portion 11.

In some embodiments, the slow IIR filter 22 of FIG. 2 uses 256 LP (Low Pass) filters, 256 being the first power of 2 that is greater than 200, which is the number of scattered pilots considered in one example. In some embodiments, the time constant of the slow IIR filter 22 is about 1 second.

In some embodiments, the Zero Replicas portion 23 operates as follows. First, multiply the input by 4 (this compensates for power reduction due to the aliasing). Then choose the one, among four hypotheses [i+T/12, i+2T/12, i+3T/12, i+4T/12] (see also FIG. 2), having the largest averaged absolute value output from the slow IIR filter 22 (see also FIG. 1). Index i runs over ¼ of the time domain CE output from the IFFT unit 21 of the 1-D portion 11.

Note that, in the described example, for guard intervals ⅟16 and ⅟32, where is no alias ambiguity. For guard interval of ⅛, only some replicas are considered and some may be zeroed since they are beyond the guard interval.

The switching arrangement 13 of FIG. 1 produces the aforementioned error metrics, and compares them to determine whether to select the 2-D portion 11 or the 1-D portion 12 to provide the channel estimate. Note that the time delay associated with the MMSE operation at 14 in the 2-D portion 11 should be compensated for by a suitable delay element (not explicitly shown) between the output 26 of the 1-D portion 12 and the switching arrangement, in order to ensure that the both of the error metrics that are compared by the switching arrangement 13 correspond to the same symbol.

In some embodiments, each of the ERR (Error) functions produces an error metric defined as follows:

$$ERR = \Sigma\{ABS(\text{Imag}(D[k]*\text{conj}(H[k])))\}$$

where k is an index of a BPSK data carrier (such as TMCC and/or AC1 carriers)

D[k] is the BPSK data carrier, and

H[k] is the channel estimate from either the 2-D portion 11 or the 1-D portion 12.

ABS is the absolute operation

Imag( ) is the operation that returns the Imaginary part conj( ) is the Conjugate Complex operation The ERR function may thus be seen to essentially provide an error metric by simply demodulating the data carrier according to the channel estimate, to see how well the channel estimate performs. In some embodiments, the IIR filters shown in the switching arrangement 13 are LP averaging filters similar to the slow IIR filter 22 (shown in FIG. 1 and described above), but having a 0.1 second time constant. The averaged error metric values output from the IIR filters are compared, and the one of the 2-D portion 11 and the 1-D portion 12 that has produced the smaller associated value is selected by a multiplexer 28. When, for example, delay conditions exist such that real paths could coincide with aliases, use of the 1-D portion 12 may not be desired. As described above, however, the error metrics provide the capability of conditionally selecting the 2-D portion 11 instead of the 1-D portion 12 to provide the channel estimate for use in processing communications received via the OFDM link. Various embodiments use various other error metrics.

Figure 3:
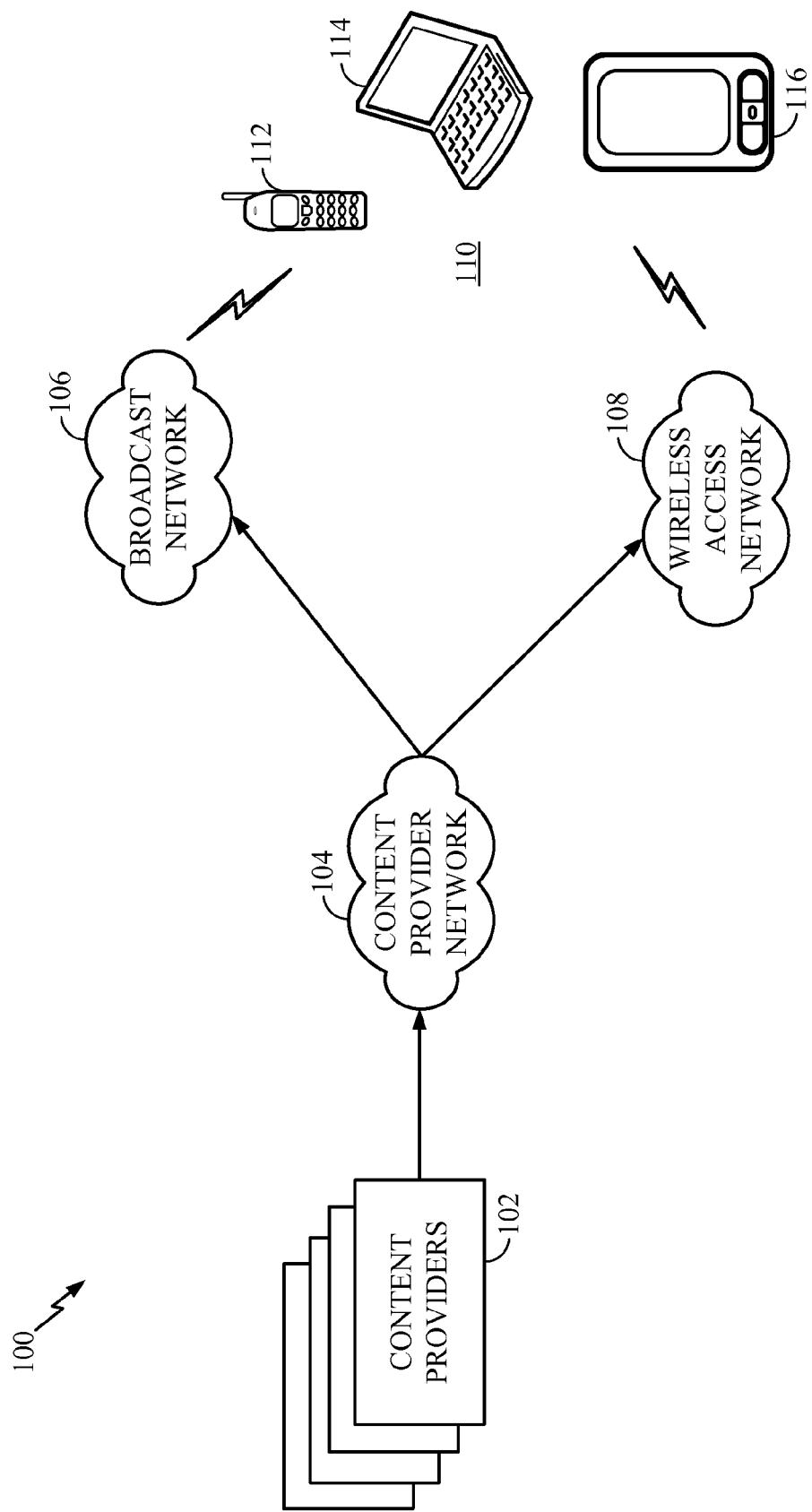
FIG. 3 diagrammatically illustrates a communication system according to exemplary embodiments of the present work.

FIG. 3 diagrammatically illustrates an example OFDM communications system 100 in which the present work may be implemented. In general, the system 100 creates and broadcasts multimedia content across various networks to a large number of mobile subscribers. The communications system 100 includes any number of content providers 102, a content provider network 104, a broadcast network 106, and a wireless access network 108. The communications system 100 is also shown with a number of devices 110 used by mobile subscribers to receive multimedia content. These devices 110 include a mobile telephone 112, a personal digital assistant (PDA) 116, and a laptop computer 114. The devices 110 illustrate just some of the devices that are suitable for use in the communications systems 100. It should be noted that although three devices are shown in FIG. 3, virtually any number of analogous devices or types of devices are suitable for use in the communications system 100, as would be apparent to those skilled in the art.

The content providers 102 provide content for distribution to mobile subscribers in the communications system 100. The content may include video, audio, multimedia content, clips, real-time and non real-time content, scripts, programs, data or any other type of suitable content. The content providers 102 provide content to the content provider network for wide-area or local-area distribution.

The content provider network 104 comprises any combination of wired and wireless networks that operate to distribute content for delivery to mobile subscribers. In the example illustrated in FIG. 3, the content provider network 104 distributes content through a broadcast network 106. The broadcast network 106 comprises any combination of wired and wireless proprietary networks that are designed to broadcast high quality content. These proprietary networks may be distributed throughout a large geographic region to provide seamless coverage to mobile devices. Typically, the geographic region will be divided into sectors with each sector providing access to wide-area and local-area content.

The content provider network 104 may also include a content server (not shown) for distribution of content through a wireless access network 108. The content server communicates with a base station controller (BSC) (not shown) in the wireless access network 108. The BSC may be used to manage and control any number of base transceiver station (BTSs) (not shown) depending on the geographic reach of the wireless access network 108. The BTSs provide access to wide-area and local-area for the various devices 110.

The multimedia content broadcast by the content providers 102 include one or more services. A service is an aggregation of one or more independent data components. Each independent data component of a service is called a flow. By way of example, a cable news service may include three flows: a video flow, an audio flow, and a control flow.

Services are carried over one of more logical channels. In Forward Link Only (FLO) applications, a logical channel is often referred to as a Multicast Logical Channel (MLC). A logical channel may be divided into multiple logical sub-channels. These logical sub-channels are called streams. Each flow is carried in a single stream. The content for a logical channel is transmitted through the various networks in a physical frame. In FLO applications, the physical frame is often referred to as a superframe.

The air interface used to transmit the physical frames to the various devices 110 shown in FIG. 3 may vary depending on the specific application and the overall design constraints. In general, communication systems employing FLO technology utilize Orthogonal Frequency Division Multiplexing (OFDM), which is also utilized by Digital Audio Broadcasting (DAB), Terrestrial Digital Video Broadcasting (DVB-T), and Terrestrial Integrated Services Digital Broadcasting (ISDB-T). OFDM is a multi-carrier modulation technique that effectively partitions the overall system bandwidth into multiple (N) sub-carriers. These sub-carriers, which are also referred to as tones, bins, frequency channels, etc., are spaced apart at precise frequencies to provide orthogonality. Content may be modulated onto the sub-carriers by adjusting each sub-carrier's phase, amplitude or both. Typically, quadrature phase shift keying (QPSK) or quadrature amplitude modulation (QAM) is used, but other modulation schemes may also be used.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present work.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use products that embody principles of the present work. Various modifications to these embodiments will be readily apparent to those skilled in the art, and the generic principles defined herein may be applied to other embodiments without departing from the spirit or scope of the disclosure. Thus, the present work is not intended to be limited to the embodiments shown herein but is to be accorded the widest scope consistent with the principles and novel features disclosed herein.

What is claimed is:

1. A method of channel estimation for a wireless Orthogonal Frequency Division Multiplexed (OFDM) link having pilots on at least some carriers in at least some symbols, comprising:
   performing a first channel estimation process that uses only frequency domain interpolation of the pilots to obtain a first candidate channel estimate for the OFDM link;
   performing a second channel estimation process that uses both time domain interpolation and frequency domain interpolation of the pilots to obtain a second candidate channel estimate for the OFDM link; and
   selecting one of the first or second candidate channel estimates for processing a communication received via the OFDM link,
   wherein said performing a first channel estimation process comprises using information associated with a time domain response produced by the second channel estimation process.

2. The method of claim 1, wherein said performing a first channel estimation process further comprises identifying a communication path associated with a largest result produced by the information associated with the time domain response averaged by a filtering process.

3. The method of claim 2, wherein the first channel estimation process applies the frequency domain interpolation only to the identified communication path.

4. The method of claim 2, wherein the filtering process comprises a slow IIR (Infinite Impulse Response) filtering process.

5. The method of claim 1, wherein said selecting includes determining which of said first and second candidate channel estimates performs better.

6. The method of claim 5, wherein said determining includes demodulating a data carrier from the OFDM link using the first and second candidate channel estimates.

7. The method of claim 1, wherein the OFDM link has pilots inserted on every twelfth carrier of each OFDM symbol.

8. An apparatus for performing channel estimation for a wireless Orthogonal Frequency Division Multiplexed (OFDM) link having pilots on at least some carriers in at least some symbols, comprising:
   an input for receiving communication signaling via the OFDM link;
   a first channel estimation unit coupled to said input and configured to perform a first channel estimation process that uses only frequency domain interpolation of the pilots to obtain a first candidate channel estimate for the OFDM link;
   a second channel estimation unit coupled to said input and configured to perform a second channel estimation process that uses both time domain interpolation and frequency domain interpolation of the pilots to obtain a second candidate channel estimate for the OFDM link; and
   a switching arrangement coupled to said first and second channel estimation units and configured to select one of the first or second candidate channel estimates for processing a communication received via the OFDM link,
   wherein said first channel estimation unit is coupled to said second channel estimation unit and configured to use in the first channel estimation process information associated with a time domain response produced by the second channel estimation process.

9. The apparatus of claim 8, wherein said first channel estimation unit includes a filter and is further configured to identify a communication path associated with a largest result produced by the information associated with the time domain response averaged by the filter.

10. The apparatus of claim 9, wherein the first channel estimation process applies the frequency domain interpolation only to the identified communication path.

11. The apparatus of claim 9, wherein the filter comprises a slow IIR (Infinite Impulse Response) filter.

12. The apparatus of claim 8, wherein said switching arrangement is configured to make a determination of which of said first and second candidate channel estimates performs better.

13. The apparatus of claim 12, wherein said switching arrangement is configured to make said determination by demodulating a data carrier from the OFDM link using the first and second candidate channel estimates.

14. The apparatus of claim 12, wherein said switching arrangement includes a selector for selecting one of said first and second candidate channel estimates based on said determination.

15. An apparatus for performing channel estimation for a wireless Orthogonal Frequency Division Multiplexed (OFDM) link having pilots on at least some carriers in at least some symbols, comprising:
   means for performing a first channel estimation process that uses only frequency domain interpolation of the pilots to obtain a first candidate channel estimate for the OFDM link;
   means for performing a second channel estimation process that uses both time domain interpolation and frequency domain interpolation of the pilots to obtain a second candidate channel estimate for the OFDM link; and
   means for selecting one of the first or second candidate channel estimates for processing a communication received via the OFDM link,
   wherein said means for performing a first channel estimation process comprises using information associated with a time domain response produced by the second channel estimation process.

16. A non-transitory computer-readable medium for supporting channel estimation for a wireless Orthogonal Frequency Division Multiplexed (OFDM) link having pilots on at least some carriers in at least some symbols, the non-transitory computer-readable medium comprising:
   code for causing at least one data processor to perform a first channel estimation process that uses only frequency domain interpolation of the pilots to obtain a first candidate channel estimate for the OFDM link;
   code for causing the at least one data processor to perform a second channel estimation process that uses both time domain interpolation and frequency domain interpolation of the pilots to obtain a second candidate channel estimate for the OFDM link; and
   code for causing the at least one data processor to select one of the first or second candidate channel estimates for processing a communication received via the OFDM link,
   wherein said code for causing at least one data processor to perform a first channel estimation process comprises using information associated with a time domain response produced by the second channel estimation process.

* * * * *